United States Patent
Takami et al.

(10) Patent No.: US 7,089,095 B2
(45) Date of Patent: Aug. 8, 2006

(54) CONTROL DEVICE FOR A HYBRID VEHICLE

(75) Inventors: Shigeki Takami, Anjo (JP); Takeshi Inuzuka, Anjo (JP); Yasuhiko Kobayashi, Anjo (JP); Yoshitaka Murase, Anjo (JP); Yoichi Tajima, Anjo (JP); Takayuki Kubo, Anjo (JP); Takahiro Kido, Anjo (JP)

(73) Assignee: Aisin AW Co., Ltd, Anjo (JP)

( * ) Notice: Subject to any disclaimer, the term of this patent is extended or adjusted under 35 U.S.C. 154(b) by 218 days.

(21) Appl. No.: 10/740,845

(22) Filed: Dec. 22, 2003

(65) Prior Publication Data

US 2004/0152558 A1    Aug. 5, 2004

(30) Foreign Application Priority Data

Dec. 27, 2002    (JP) ............................. 2002-382173

(51) Int. Cl.
*B60L 9/00*    (2006.01)
*B60L 11/00*    (2006.01)

(52) U.S. Cl. .......................................... 701/22; 701/54

(58) Field of Classification Search ................ 701/22, 701/54; 700/6; 903/902, 905; 60/325, 911; 180/165; 307/9.1, 10.1; 477/34
See application file for complete search history.

(56) References Cited

U.S. PATENT DOCUMENTS 4,441,573 A * 4/1984 Carman et al. ............. 180/165
5,542,887 A   8/1996 Tsukamoto et al.

* cited by examiner

*Primary Examiner*—Yonel Beaulieu
(74) *Attorney, Agent, or Firm*—Oliff & Berridge, PLC (57) ABSTRACT

A control unit for a hybrid vehicle includes a take-off detection unit that detects a start of movement of the hybrid vehicle from a stopped state; and a torque control unit that limits a engine torque input to an automatic transmission from becoming excessive by generating negative torque using a regeneration operation of a motor on occasions when the start of running of the hybrid vehicle is detected by the take-off detection unit. Accordingly, it is possible to reliably inhibit problems, such as an occupant of the hybrid vehicle being caused to feel an unpleasant jolt due to torque transmitted to a driven wheel side increasing instantaneously as a result of change in an application state of a clutch during the start of movement.

24 Claims, 8 Drawing Sheets

|  | C-1 | C-2 | C-3 | B-1 | B-2 | B-3 | B-4 | B-5 | F-1 | F-2 |
|---|---|---|---|---|---|---|---|---|---|---|
| N |  |  |  |  |  |  |  | ○ |  |  |
| 1st | ○ |  |  |  |  | △ |  | ○ |  | ○ |
| 2nd | ○ |  |  | △ | ○ |  |  | ○ | ○ |  |
| 3rd | ○ |  |  | △ | ○ |  | ○ |  | ○ |  |
| 4th | ○ |  | ○ | △ | ○ |  |  |  | ○ |  |
| 5th | ○ | ○ | ○ |  |  |  |  |  |  |  |
| REV |  | ○ |  |  |  | ○ |  | ○ |  |  |

CONTROL DEVICE FOR A HYBRID VEHICLE

INCORPORATION BY REFERENCE

The disclosure of Japanese Patent Application No. 2002-382173 filed on Dec. 27, 2002, including the specification, drawings and abstract, is incorporated herein by reference in its entirety.

BACKGROUND OF THE INVENTION

1. Field of Invention

The invention relates to a control device for a hybrid vehicle. More specifically, the invention relates to a control device for a hybrid vehicle that is able to inhibit generation of a jolt which is unpleasant for an occupant of the hybrid vehicle and which is caused by change of an application state of a take-off clutch within an automatic speed change mechanism when an accelerator pedal is depressed to make the hybrid vehicle start moving (take-off).

2. Description of Related Art

Conventionally, art has been proposed (for an example, see Japanese Patent Laid-Open Publication No. 07-293687) for a torque converter type automatic transmission that is mounted in a vehicle in which, when the vehicle is stopped with the shift range left in a drive range, a predetermined friction engagement element (clutch) within the transmission (automatic speed change mechanism) is caused to slip such that a neutral state is approached. This art executes a so-called neutral control in which, for example, a fluid pressure supplied to a hydraulic servo of a clutch assisting with the start of movement (hereinafter referred to as a "take-off clutch") within the transmission is regulated based upon predetermined conditions such that the take-off clutch is able to maintain a slipping state. Further, it is possible to promote a smooth start-up of movement because, when the take-off clutch moves from the slipping state to a fully applied state, the fluid pressure of the hydraulic servo is determined based upon various conditions, such as a target application time and an input torque to the transmission.

Moreover, by executing the neutral control while the vehicle is stopped, torque transmitted to driven wheels via the torque converter and the transmission is reduced. Accordingly, an increase in fuel consumption resulting from drag of the torque converter while the vehicle is stopped by depression of a brake pedal is inhibited, and it is possible to reduce vibrations caused by idle revolution.

SUMMARY OF THE INVENTION

However, with the related art, Applicants realized, in the case where the accelerator pedal is depressed immediately after the brake pedal, that was depressed during stopping, is released, an engine torque input to the transmission increases rapidly due to an increase in a throttle opening amount while the take-off clutch moves to the fully applied state from the slipping state. On occasion, this causes a torque capacity, that is permitted by a clutch application pressure that gradually rises at a predetermined sweep amount, to be exceeded. In this case, friction disks of the take-off clutch, which have started application once for take-off, begin to slip, and immediately after this, the take-off clutch is applied once again and moves toward full application due to the supply of an application pressure at an even higher fluid pressure. As a result, the torque transmitted to the driven wheels from the transmission increases instantaneously, and the occupant of the hybrid vehicle is liable to feel an unpleasant jolt.

Given these considerations, it is an object of the invention to provide a control device for a hybrid vehicle that can address more than the described problems by using a specially provided motor in the hybrid vehicle; this control device is configured so as to be able to limit excessive engine torque that is input to a transmission, by generating negative torque using the motor when the hybrid vehicle starts to move.

It should be noted that the concept "on occasions when the start to move requirement of the hybrid vehicle is detected" according to the invention indicates, of course, occasions when the hybrid vehicle actually starts moving due to drive of the engine. However, in addition, the concept also includes, for example, occasions when the start of movement is executed using drive of the motor alone, during execution of an idle stop control that stops the engine when the hybrid vehicle is stopped, following which drive of the engine starts and running is continued. Moreover, the "motor" according to the invention is not limited to a motor in a restricted definition of the word, namely, a motor that converts electrical energy into rotational movement. The concept of the "motor" according to the invention also includes a so-called generator that converts rotational movement into electrical energy.

According to the invention, when the starting movement requirement of the hybrid vehicle is detected by the take-off requirement detection unit, the torque control unit causes the motor to generate a negative torque, whereby the torque input to the transmission is limited. Accordingly, by using the motor that is specially provided in the hybrid vehicle, even in the case, for example, that an accelerator pedal is depressed while the clutch within the transmission moves from the reduced state to the fully applied state, it is possible to reliably inhibit excessive engine torque from being input to the transmission due to the action of the negative torque from the motor. Accordingly, it is possible to reliably inhibit problems such as, for example, the occupant of the hybrid vehicle feeling an unpleasant jolt due to the torque transmitted to the driven wheel side rising instantaneously as a result of friction disks of the clutch, which were starting application, beginning to slip, and immediately after this, the clutch being applied once again. In addition, it is possible to inhibit heat build-up in the friction disks that comprise the clutch used for starting movement.

Also, according to the invention, the take-off requirement detection unit detects the need to start movement requirement based on an operation state of the brake of the hybrid vehicle, which is detected by the brake operation state detection unit. Accordingly, it is possible to reliably detect a take-off (start movement) timing which is required for execution of a limitation control for limiting excessive torque.

Further, according to the invention, the torque control unit executes driving control of the motor such that the negative torque becomes the predetermined value while the clutch is moving from the reduced state of the transmitted torque to the fully applied state. As a result, it is possible to reliably execute a limitation of the torque at the timing at which excessive torque is potentially about to be input to the transmission.

Additionally, according to the invention, the torque control unit executes driving control of the motor such that the negative torque becomes the predetermined value when the throttle opening amount at the engine side changes by a predetermined value or more. Accordingly, it is possible to output the negative torque in an accurate manner using driving control of the motor.

Also according to the invention, the torque control unit calculates the input torque limit value for the torque input to the clutch based upon the application pressure command value from the application pressure command unit, and calculates the negative torque that it is necessary to output from the motor based upon the calculated input torque limit value and the engine torque at the time of calculation thereof. Accordingly, it is possible to accurately calculate the value of the negative torque that can reliably limit excessive torque that is potentially about to be input to the transmission.

In the invention, the torque control unit calculates, when calculating the negative torque, the necessary motor torque that forms the basis of the negative torque. When it is determined that the necessary motor torque is less than zero, the torque control unit obtains the outputable motor torque at that time. Accordingly, it is possible to realize output of the negative torque in an accurate manner.

Further, in the invention, the torque control unit sets, when the outputable motor torque is a value equal to or less than the necessary motor torque, the outputable motor torque as the torque that it is necessary to be output from the motor for the negative torque. Accordingly, it is possible to provide an effective response in cases where the motor torque alone is insufficient to limit the input of excessive torque.

Further, according to the invention, the torque control unit also calculates the engine torque that is necessary to add to the set outputable motor torque. Accordingly, even in the case that the motor torque alone is insufficient, it is possible to reliably reduce the input of excessive torque by reducing the engine torque itself.

Lastly, according to the invention, the transmission is provided with the fluid transmission unit that receives the torque output from the engine and the motor, and the automatic speed change mechanism that receives the output torque via the fluid transmission unit. Moreover, the motor is provided with the output member that is directly coupled to the output shaft of the engine, and is coupled to the input member of the fluid transmission unit. Accordingly, the negative torque from the motor is effectively utilized, and it is possible to limit the input of excessive engine torque to the automatic speed change mechanism.

BRIEF DESCRIPTION OF THE DRAWINGS

Hereinafter, an embodiment of the invention will be described with reference to the drawings, in which.

DETAILED DESCRIPTION OF PREFERRED EMBODIMENTS

Figure 2:
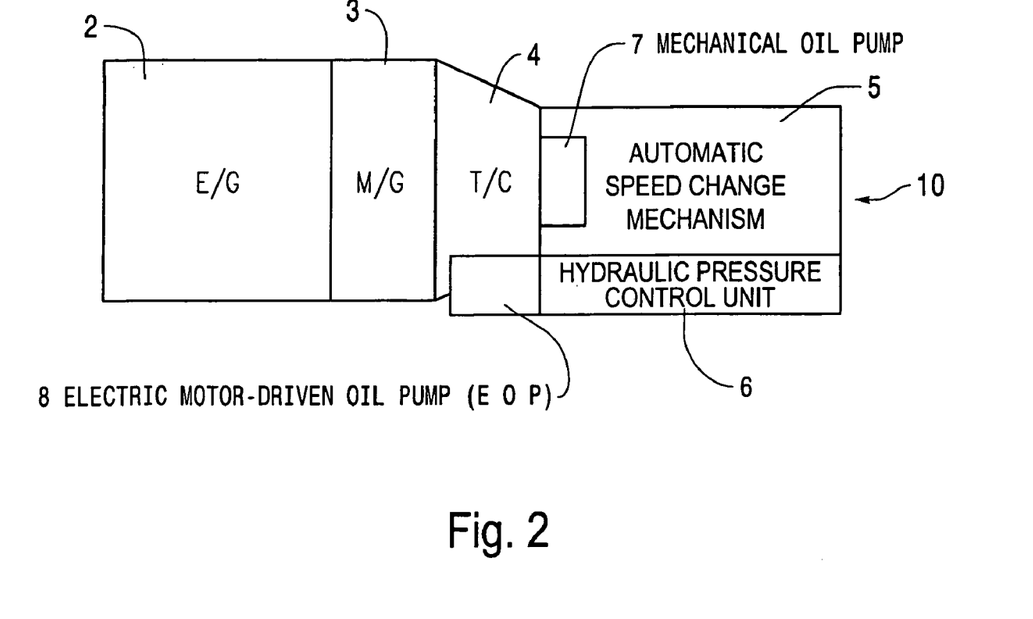
FIG. 2 is a schematic block diagram of a drive train of the hybrid vehicle.
Figure 3A:
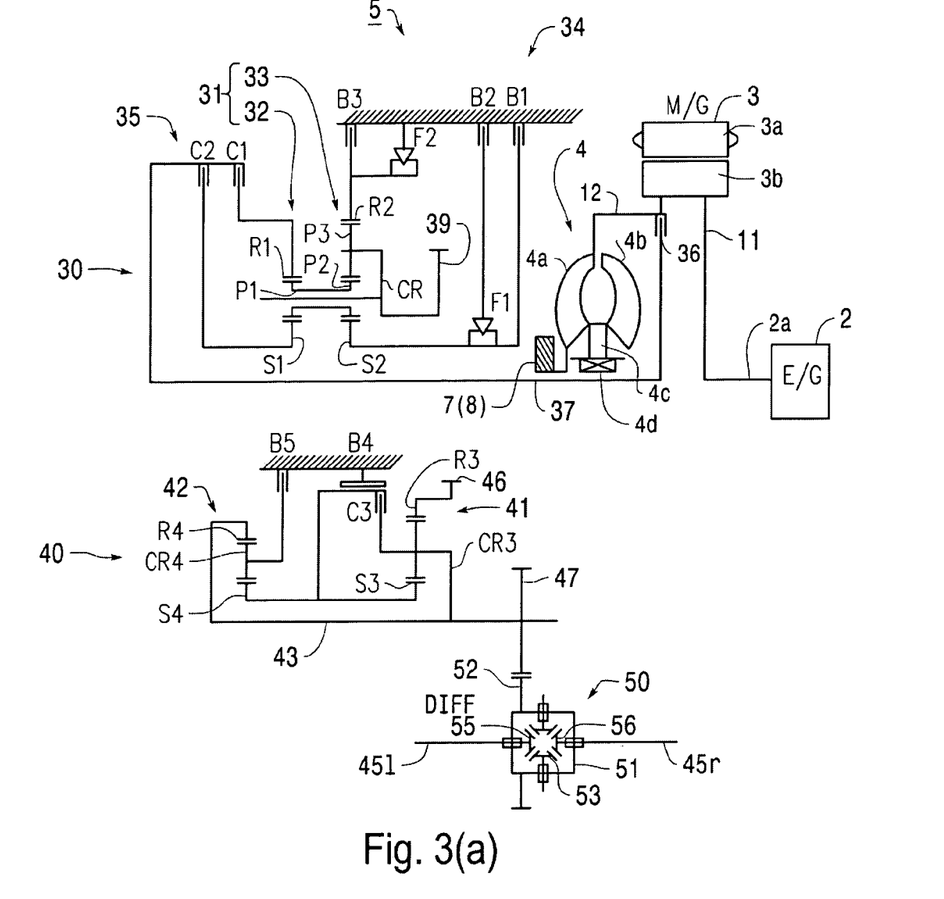
FIG. 3(a) shows a schematic view of the automatic speed change mechanism.

First, a drive train of a hybrid vehicle to which a control device according to the invention is applied, and a transmission provided therein, will be explained with reference to FIGS. 2 and 3. As shown in FIG. 2, a drive power source is configured from an internal combustion engine (E/G) (hereinafter referred to as "engine") 2, and a motor generator (M/G) (hereinafter referred to as "motor") 3. The driving force of this drive power source is output to an automatic transmission 10. The automatic transmission 10 is provided with a torque converter (T/C) 4, which is a type of fluid transmission unit, the automatic speed change mechanism 5, a hydraulic pressure control unit 6, a mechanical oil pump 7, and an electric motor-driven oil pump (EOP) 8.

The automatic speed change mechanism 5 described, among other actions, changes the speed of the input driving force based upon predetermined running conditions of the hybrid vehicle, and outputs the driving force to driven wheels of the hybrid vehicle. Moreover, the automatic speed change mechanism 5 is provided with a plurality of friction engagement elements (clutches and brakes) for executing shifting. The hydraulic pressure control unit 6 executes shifting by controlling the application of fluid pressure to the friction engagement elements. Along with this, the hydraulic pressure control unit 6 controls the operation of the torque converter 4. The mechanical oil pump 7 and the electric motor-driven oil pump 8 supply fluid pressure to the hydraulic pressure control unit 6. The mechanical oil pump 7 is configured so as to operate in association with the torque converter 4, and is driven by the driving force from the engine 2 and the motor generator 3. The electric motor-driven oil pump 8 operates independently of the driving force of the engine 2 and the motor generator 3, and is driven by a motor (not shown) that is supplied with electric power by a separate battery (not shown).

Next, the automatic speed change mechanism 5 will be described. The automatic speed change mechanism 5, as shown in FIG. 3(a), is provided with a main transmission mechanism 30, an auxiliary transmission mechanism 40, and a deferential gear unit 50. The main transmission mechanism 30 is disposed on a first shaft (hereinafter referred to as "input shaft") 37 that is aligned with a crank shaft 2a, that acts as an engine output shaft. The driving force from the engine 2 and the motor generator 3 is transmitted to the input shaft 37 via the torque converter 4 that has a lock-up-clutch 36. The mechanical oil pump 7 and the electric motor-driven oil pump 8, that are next to the torque converter 4, a brake portion 34, a planetary gear unit portion 31, and a clutch portion 35 are disposed in that order on the input shaft 37.

The motor generator 3 has a stator 3a, and a rotor (output member) 3b that rotates with respect to the stator 3a. A drive plate 11 is provided at an inside periphery side of the rotor 3b, and the crank shaft 2a of the engine 2 is coupled to a center of rotation of the drive plate 11. Moreover, the torque converter 4 includes the lock-up-clutch 36, a pump impeller 4a, a turbine runner 4b, a stator 4c that is only permitted to rotate in one direction due to a one-way-clutch 4d, and a front cover (input member) 12 that is disposed so as to enclose the previously described members.

The planetary gear unit portion 31 is configured from a simple planetary gear 32 and a double pinion planetary gear 33. The simple planetary gear 32 is formed from a sun gear S1, a ring gear R1, and a carrier CR that supports a pinion P1 that meshes with the sun gear S1 and the ring gear R1. The double pinion planetary gear 33 is formed from a sun gear S2, a ring gear R2, and the carrier CR that supports, in an intermeshing fashion, a pinion P2 that meshes with the sun gear S2, and a pinion P3 that meshes with the ring gear R2. In addition, the sun gear S1 and the sun gear S2 are supported so as to be respectively rotatable in a hollow shaft supported in a rotatable manner by the input shaft 37. Moreover, the carrier CR is shared by both of the planetary gears 32, 33, and the pinions P1, P2, that mesh respectively with the sun gear S1 and the sun gear S2, are coupled so as to rotate integrally.

The brake portion 34 is provided with a one-way-clutch F1, a brake B1, and a brake B2 in that order from an internal diameter side to an external diameter side. Moreover, a counter drive gear 39 is coupled to the carrier CR via a spline. Further, a one-way-clutch F2 is interposed between the ring gear R2 and a case (representatively shown by hatching), and a brake B3 is interposed between an external periphery of the ring gear R2 and the case. In addition, the clutch portion 35 is provided with a forward clutch (hereinafter referred to as "clutch") C1, that is in an input clutch (engagement element), and a direct clutch C2. The clutch C1 is disposed at an external periphery of the ring gear R1, and the direct clutch C2 is interposed between an internal periphery of a moving member (not shown) and a flange portion (not shown) coupled to an end of the hollow shaft.

The auxiliary transmission mechanism 40 is positioned on a second shaft 43 that is disposed in parallel to the input shaft 37. The input shaft 37 and the second shaft 43, along with a third shaft formed from differential shafts (left and right vehicle axles) 45l, 45r, are arranged such that they form a triangular shape when viewed from the side. In addition, the auxiliary transmission mechanism 40 has simple planetary gears 41, 42, and is configured as a Simpson gear train with a carrier CR3 and a ring gear R4 that are coupled integrally, and a pair of sun gears S3, S4 that are also coupled integrally. Moreover, a ring gear R3 is coupled to a counter drive gear 46 so as to form an input portion, and the carrier CR3 and the ring gear R4 are coupled to a reduction gear 47 that forms an output portion. Moreover, a UD direct clutch C3 is interposed between the ring gear R3 and the integral sun gears S3, S4; the integral sun gear S3 (S4) can be braked as necessary by a brake B4 and the carrier CR4 can be braked as necessary by a brake B5. As a result, the auxiliary transmission mechanism 40 can generate three forward shift speeds.

The differential gear unit 50 that configures the third shaft has a differential case 51; a gear 52, that meshes with the reduction gear 47, is fixed to the differential case 51. Moreover, a differential gear 53 and left and right side gears 55, 56 are supported by the differential case 51 so as to intermesh and be rotatable. The left and right vehicle axles 45l, 45r respectively extend from the left and right side gears 55, 56. Accordingly, rotation of the gear 52 is distributed according to load torque, and transmitted to respective left and right front wheels (not shown) via the left and right vehicle axles 45l, 45r.

The aforementioned clutches C1, C2, and the brakes B1, B2, B3, B4, B5 are respectively provided with hydraulic servos (not shown) that are driven and controlled by the supply of fluid pressure controlled by the hydraulic pressure control unit 6. Each hydraulic servo has a piston that presses a plurality of inner friction disks (friction members) and outer friction disks (friction members), which are disposed such that clearance is left between the friction disks and the piston, respectively. The configuration of the hydraulic servos is such that an applied state of the respective clutch or brake can be selectively obtained. It should be noted that, in the explanation that follows, a state immediately prior to application of the clutch C1 is a state in which the respective clearances between the piston, the inner friction disks and the outer friction disks are reduced; in this state, the clutch C1 is not fully applied.

Next, operation of the automatic speed change mechanism 5 will be explained with reference to the clutch/brake application chart of FIG. 3(b). In a forward first speed (1ST) state, the clutch C1, the one-way-clutch F2 and the brake B5 are applied. Accordingly, the main transmission mechanism 30 enters the first speed state, and the reduced rotation thereof is transmitted to the ring gear R3 of the auxiliary transmission mechanism 40 via the counter drive gears 39, 46. The auxiliary transmission mechanism 40 is in the first speed state because the carrier CR4 is stopped by the brake B5. The reduced rotation of the main transmission mechanism 30 is further reduced by the auxiliary transmission mechanism 40, and then the reduced rotation is transmitted to the vehicle axles 45l, 45r via the gears 47, 52 and the differential gear unit 50.

In a forward second speed (2ND) state, the brake B2 is applied in addition to the clutch C1, and switching is smoothly executed from application of the one-way-clutch F2 to application of the one-way-clutch F1; thus, the main transmission mechanism 30 enters the second speed state. Moreover, the auxiliary transmission mechanism 40 is in the first speed state because the brake B5 is applied. Accordingly, the entire automatic speed change mechanism 5 generates the rotation speed of the second speed state due to the combination of the second speed state of the main transmission mechanism 40 and the first speed state of the auxiliary transmission mechanism 40.

In a forward third speed (3RD) state, the main transmission mechanism 30 is maintained in the same state as found in the second speed state, namely, the clutch C1, the brake B2, and the one-way-clutch F1 are applied; however, in the auxiliary transmission mechanism 40, the brake B4 is applied. As a result, the sun gears S3, S4 are fixed, and the rotation from the ring gear R3 is changed to second speed rotation and output from the carrier CR3. Accordingly, a second speed state of the main transmission mechanism 30 and a second speed state of the auxiliary transmission mechanism 40 are combined, and this causes the entire automatic speed change mechanism 5 to generate the rotation speed of the third speed state.

In a forward fourth speed (4TH) state, the main transmission mechanism 30 continues to be maintained in the same state as found in the second and third speed states, namely, the clutch C1, the brake B2, and the one-way-clutch F1 are applied; however, in the auxiliary transmission mechanism 40, the brake B4 is released, and, along with the release of brake B4, the UD direct clutch C3 is applied. In this state, the ring gear R3 and the sun gear S3 (S4) are coupled, and both of the planetary gears 41, 42 enter a direct drive rotation state in which they rotate integrally. Accordingly, the second speed state of the main transmission mechanism 30 and the directly coupled state (the third speed state) of the auxiliary transmission mechanism 40 are combined. This causes the entire automatic speed change mechanism 5 to generate the rotation speed of the fourth speed state.

In a forward fifth speed (5TH) state, the clutch C1 and the direct clutch C2 are applied, and the rotation of the input shaft 37 is transmitted to both the ring gear R1 and the sun gear S1. The main transmission mechanism 30 enters a direct drive rotation state in which the members of the planetary gear unit portion 31 rotate integrally. Moreover, the auxiliary transmission mechanism 40 enters a direct drive rotation state in which the UD direct clutch C3 is applied. Accordingly, the third speed state (the directly coupled state) of the main transmission mechanism 30 and the third speed state (the directly coupled state) of the auxiliary transmission mechanism 40 are combined, and this causes the entire automatic speed change mechanism 5 to generate the rotation speed of the fifth speed state.

In a reverse (REV) state, the direct clutch C2 and the brake B3, as well as the brake B5, are applied. In this state, the main transmission mechanism 30 outputs reverse rotation; meanwhile, in the auxiliary transmission mechanism 40, the carrier CR4 is stopped from rotating in the reverse direction by the brake B5, and the first speed state is maintained. Accordingly, reverse rotation of the main transmission mechanism 30 and the rotation speed of the first speed state of the auxiliary transmission mechanism 40 are combined. As a result, it is possible to generate reverse reduced rotation.

Figure 3B:
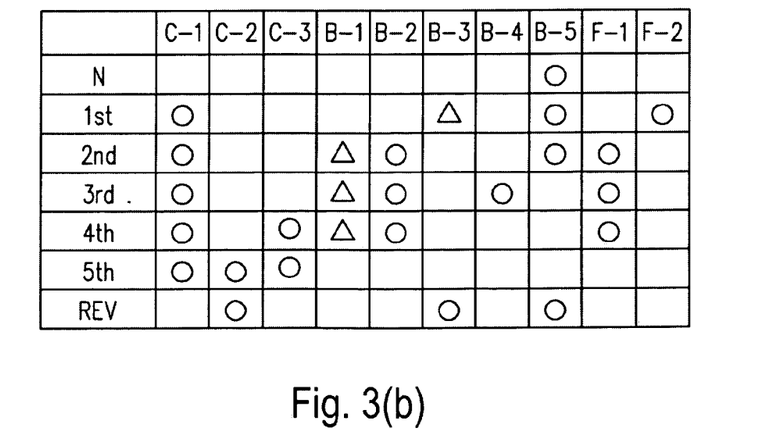
FIG. 3(b) shows a clutch/brake application chart.

It should be noted that in FIG. 3(b), a circle (○) indicates an applied state, and a triangle (Δ) indicates operation during engine brake. More specifically, with regard to operation during engine brake, in the forward first speed state, the brake B3 is applied, and the ring gear R2 is fixed instead of using the one-way-clutch F2; and, in the forward second, third and fourth speed states, the brake B1 is applied, and the sun gear S2 is fixed instead of using the one-way-clutch F1.

Figure 1:
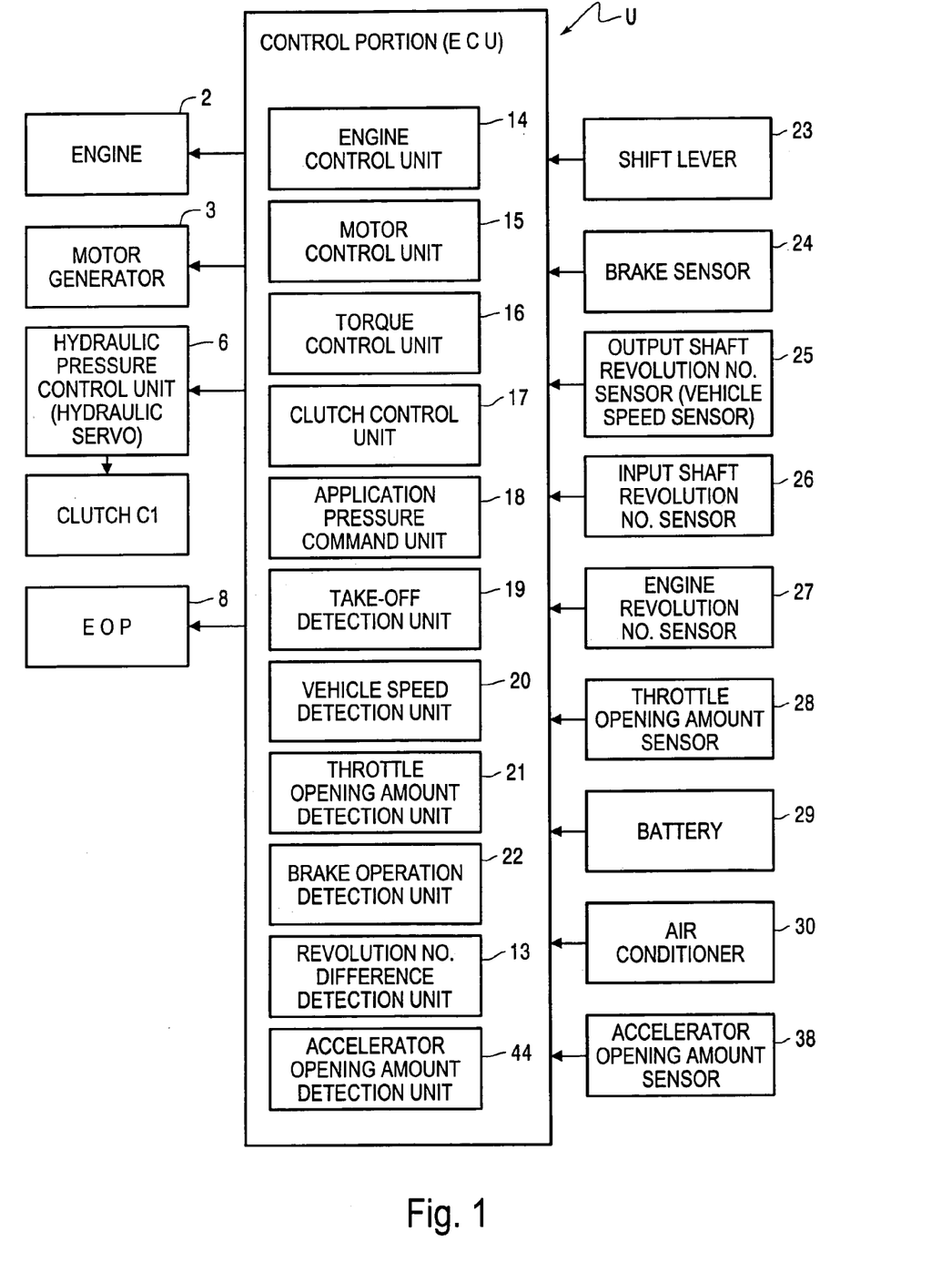
FIG. 1 is a block diagram showing a control device for a hybrid vehicle according to an embodiment of the invention.

Next, the control device for a hybrid vehicle according to the invention will be explained with reference to FIG. 1. FIG. 1 is a block diagram showing the control device for a hybrid vehicle according to the embodiment of the invention. As shown in FIG. 1, the control device includes a control portion (ECU) U. The engine (E/G) 2 and the motor generator (M/G) 3 (refer to FIG. 2), the hydraulic pressure control unit 6, and the electric motor-driven oil pump (EOP) 8, are respectively connected to the control portion U. Further, a shift lever 23 disposed, for example, in proximity to the driver's seat; a brake sensor 24 provided in association with the brake pedal (not shown); an output shaft revolution number sensor (vehicle speed sensor) 25 associated with the vehicle axles 45l, 45r, that are output shafts of the automatic transmission 10; an input shaft revolution number sensor 26 associated with the input shaft 37; an engine revolution number sensor 27 associated with the engine 2; a throttle opening amount sensor 28 that detects a throttle opening amount at the engine 2 side; a battery 29; a (passenger compartment) air conditioner 30; and an accelerator opening amount sensor 38, and the like, are respectively connected to the control portion U.

Note that, in actuality, a number of the (friction) engagement elements, such as the clutches, the brakes, and the like, are coupled to the hydraulic pressure control unit (hydraulic servo) 6. However, for ease of illustration, only the clutch C1 is shown in FIG. 1. Further, the aforementioned electric motor-driven oil pump 8 is provided independently from the mechanical oil pump 7 (refer to FIG. 2) that generates fluid pressure by the drive of the engine 2. The electric motor-driven oil pump 8 executes control such that, when the mechanical oil pump 7 stops as a result of its operative association with the engine 2, the electric motor-driven oil pump 8 is driven and supplies fluid pressure to the hydraulic pressure control unit 6 that is low as compared to that supplied by the mechanical oil pump 7; however, when the mechanical oil pump 7 is driven as a result of its operative association with the engine 2 so as to supply fluid pressure to the hydraulic pressure control unit 6, control is executed such the electric motor driven oil pump 8 ceases supply of fluid pressure.

Moreover, the control portion U includes an engine control unit 14; a motor control unit 15; a torque control unit 16; a clutch control unit 17; an application pressure command unit 18; a take-off detection unit (take-off requirement detection unit) 19; a vehicle speed detection unit 20; a throttle opening amount detection unit 21; a brake operation detection unit (brake operation state detection unit) 22; a revolution number difference detection unit 13; and an accelerator opening amount detection unit 44 that detects an accelerator opening amount.

The engine control unit 14 executes various controls related to engine drive, such as an engine stop control of the engine 2, a completed combustion determination for the engine 2, and an ignition control of the engine 2. These controls are based upon a vehicle speed detected by the vehicle speed detection unit 20 based upon a detection result of the output shaft revolution number sensor 25, a brake operation state detected by the brake operation detection unit 22 based upon a detection result of the brake sensor 24, and the like.

The motor control unit 15 executes running drive controls including a start control, a stop control, and an assist-control; an electric generation control for generating electricity by making the motor generator 3 generate negative torque; and a regeneration control that regenerates driving force. Further, the motor control unit 15 executes control of the motor generator 3 at appropriate times based upon various conditions, such as the vehicle speed detected by the vehicle speed detection unit 20, the throttle opening amount detected by the throttle opening amount detection unit 21, the accelerator opening amount detected by the accelerator opening amount detection unit 44, a driver deceleration intention reflected in the detection of the brake operation detection unit 22, a command from a shift control unit (not shown), and torque calculation data from a torque calculation unit (not shown). In addition, when the take-off detection unit 19 detects the start of running (take-off or start of movement) of the hybrid vehicle, the motor control unit 15 executes regenerative control of the motor generator 3 based upon the command output from the torque control unit 16 so as to generate negative torque, and thus the generation of excessive engine torque during the start of movement is inhibited.

In the case that the start of movement (start of running or take-off), namely, the start of movement requirement of the driver, is detected by the take-off detection unit 19, if a change in the throttle opening amount equal to or more than a predetermined value is detected by the throttle opening amount detection unit 21 while the clutch C1 is moving from a substantially slipping state (a reduced state of the transmitted torque) to a fully applied state due to the clutch control unit 17, that is a neutral control unit, the torque control unit 16 calculates a maximum input torque that is permissible without causing slipping of the clutch C1, namely, an input torque limit value (upper limit value) $T_{in\_MAX}$, based upon a fluid pressure command value (an application pressure command value), and other parameters, output from the application pressure command unit 18.

The input torque limit value $T_{in\_MAX}$ is calculated in accordance with the following equation, where a piston cross sectional area [m²] is Ap, a friction coefficient is μ, a friction member number of the clutch C1 is n, a friction member outer radius/2 [m] is $r_o$; a friction member inner radius/2 [m] is $r_i$, a load of a spring that urges the piston away from the friction members is F; and the fluid pressure command value output from the application pressure command unit 18 is P.

$$T_{in\_MAX}[Nm]=(2/3)\times\omega\times 2\times n\times(P\times Ap-F)\times(r_o^3-r_i^3)/(r_o^2-r_i^2)$$

Further, by using a torque ratio t derived from a T/C speed ratio e, the engine torque maximum value $T_{MAX}$ can be derived from the following equation:

$$T_{MAX}=T_{in\_MAX}/t.$$

Accordingly, the torque control unit 16 calculates a negative torque Tm, that is necessary for the motor generator 3 to output, based upon the calculated input torque limit value $T_{in\_MAX}$, and an engine torque (actual engine torque) Te at the time of calculation of the negative torque Tm. In other words, a negative torque Tm is calculated based upon the following equation:

$$T_m=T_{in\_MAX}-Te.$$

Further, the torque control unit 16 outputs a signal based upon the negative torque Tm to the motor control unit 15 in order to limit the engine torque Te supplied to the automatic speed change mechanism 5 of the automatic transmission 10. The motor control unit 15 then executes driving control of the motor generator 3, and the negative torque Tm is output through regeneration operation of the motor generator 3.

Note that the engine torque Te is calculated using the equation below. More specifically, the engine torque Te is derived based upon a capacity coefficient C derived from the T/C speed ratio e shown in FIG. 6, and an engine revolution acceleration $\omega e$.

$$Te=C\times Ne^2+Ie\times\omega e$$

Figure 6:
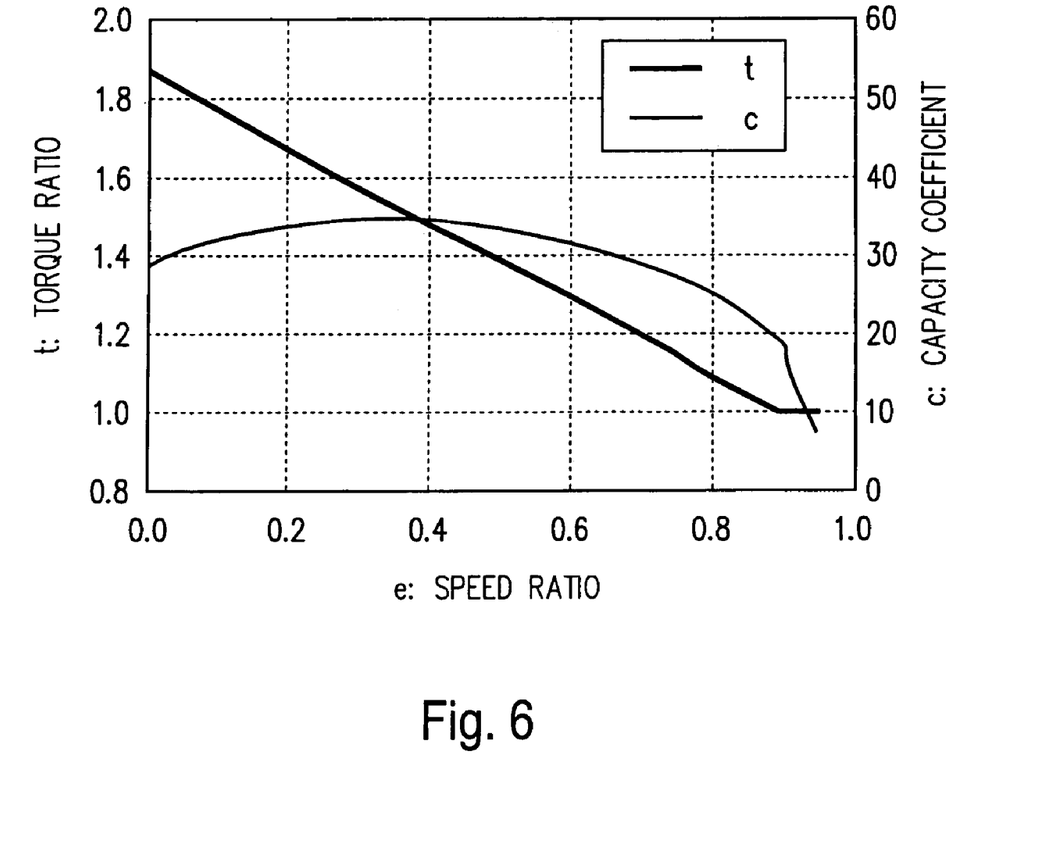
FIG. 6 is a graph showing the correlation between a torque ratio, a speed ratio, and a torque capacity coefficient.

Using this equation it is possible to derive the engine torque while also taking into consideration inertia. Note that Ne is an engine revolution number, Ie is a value equal to the sum of the respective inertias of the engine 2, the drive plate 11 shown in FIG. 3(*a*), the pump (pump impeller) of the torque converter 4, and the rotor 3*b* of the motor generator 3 shown in FIG. 3(*a*). Note that the thick solid line in FIG. 6 illustrates a change in the torque ratio t, and the thin solid line illustrates a change in the capacity coefficient C.

The clutch control unit 17 has a function that acts as an application pressure supply unit. This application pressure supply unit outputs a signal to the hydraulic pressure control unit 6 in order to supply the application pressure to each hydraulic servo of the clutch C1, the clutches C2, C3, and the brakes B1, B2, B3, B4, B5 of the automatic transmission 10, in accordance with the fluid pressure command value (the application pressure command value) output from the application pressure command unit 18 that sets the application pressure at a predetermined value. Further, the clutch control unit 17 has a function that acts as the neutral control unit. This neutral control unit maintains the clutch C1 in the automatic transmission 10 in the state immediately prior to application (namely, the substantially slipping state) when the hybrid vehicle is stopped while still in the driving range (D range) of the automatic transmission 10, and executes control such that the clutch C1 moves from the slipping state to the fully applied state when the throttle opening amount of the hybrid vehicle side is detected to be equal to or greater than the predetermined value by the throttle opening amount detection unit 21 after the brake pedal (hybrid vehicle brake) of the hybrid vehicle side is changed from an ON state to an OFF state.

The application pressure command unit 18 outputs the fluid pressure command value for setting the application pressure of the clutch C1 at the predetermined value to the clutch control unit (the application pressure supply unit) 17.

The take-off detection unit 19 detects the start of movement (take-off of the hybrid vehicle) from the stopped state of the hybrid vehicle based upon detection of the OFF state of the brake pedal by the brake operation detection unit 22. Accordingly, the take-off detection unit 19 functions as the take-off requirement detection unit that detects the start movement requirement of the driver. It should be noted that the take-off detection unit (the take-off requirement detection unit) 19 may be configured without being based on the detection of the OFF state of the brake pedal as described above. The take-off detection unit (the take-off requirement detection unit) 19 may be configured such that start of movement of the hybrid vehicle (namely, detection of the start moving requirement) is based upon, for example, detection of a movement distance (a depression amount) of the brake pedal equal to a predetermined value, or detection of the depression amount and a movement speed of the brake pedal, or alternatively, detection of depression of the accelerator pedal.

The vehicle speed detection unit 20 detects the vehicle speed (vehicle running, or moving, speed) based upon the detection result of the output shaft revolution number sensor 25. Further, the throttle opening amount detection unit 21 detects the throttle opening amount at the engine 2 side based upon the detection result of the throttle opening amount sensor 28.

The brake operation detection unit 22 detects a brake operation state, namely, the ON state and the OFF state of the brake pedal (not shown), based upon the detection result of the brake sensor 24. The brake operation detection unit 22 functions as a brake operation state detection unit that detects the operation state of the brake pedal that results from operation by the driver. Note that the brake operation detection unit 22 is configured such that it can detect the movement distance (the depression amount) of the brake pedal equal to the predetermined value, and the depression amount and the movement speed of the brake pedal, as well as the ON and OFF states of the brake pedal.

The revolution number difference detection unit 13 detects a difference between the revolution numbers of the engine revolution number Ne based upon the detection result of the engine revolution number sensor 27, and an input shaft revolution number Ni based upon the detection result of the input shaft revolution number sensor 26.

Next, the neutral control executed by the clutch control unit 17 will be explained. The clutch control unit 17 controls (i.e., executes the neutral control) a fluid pressure PC1 supplied to the clutch C1 based upon the detection result of the revolution number difference detection unit 13 such that the fluid pressure PC1 becomes a holding pressure PC1*w* that places the clutch C1 in the state immediately prior to application; along with this, the clutch control unit 17 terminates the neutral control based upon the detection of starting movement of the hybrid vehicle by the take-off detection unit 19. Note that, in this embodiment, the clutch control unit 17 detects the holding pressure PC1*w* that places the clutch C1 in the state immediately prior to application based upon the detection result of the revolution number difference detection unit 13, namely, the difference between the revolution numbers of the engine revolution number Ne and the input shaft revolution number Ni. However, the embodiment is not limited to this, and may be configured such that the holding pressure PC1*w* is detected based upon, for example, the state of the automatic transmission 10 (for example, change of the input shaft revolution number Ni or change of the revolution number of the clutch C1).

Figure 4:
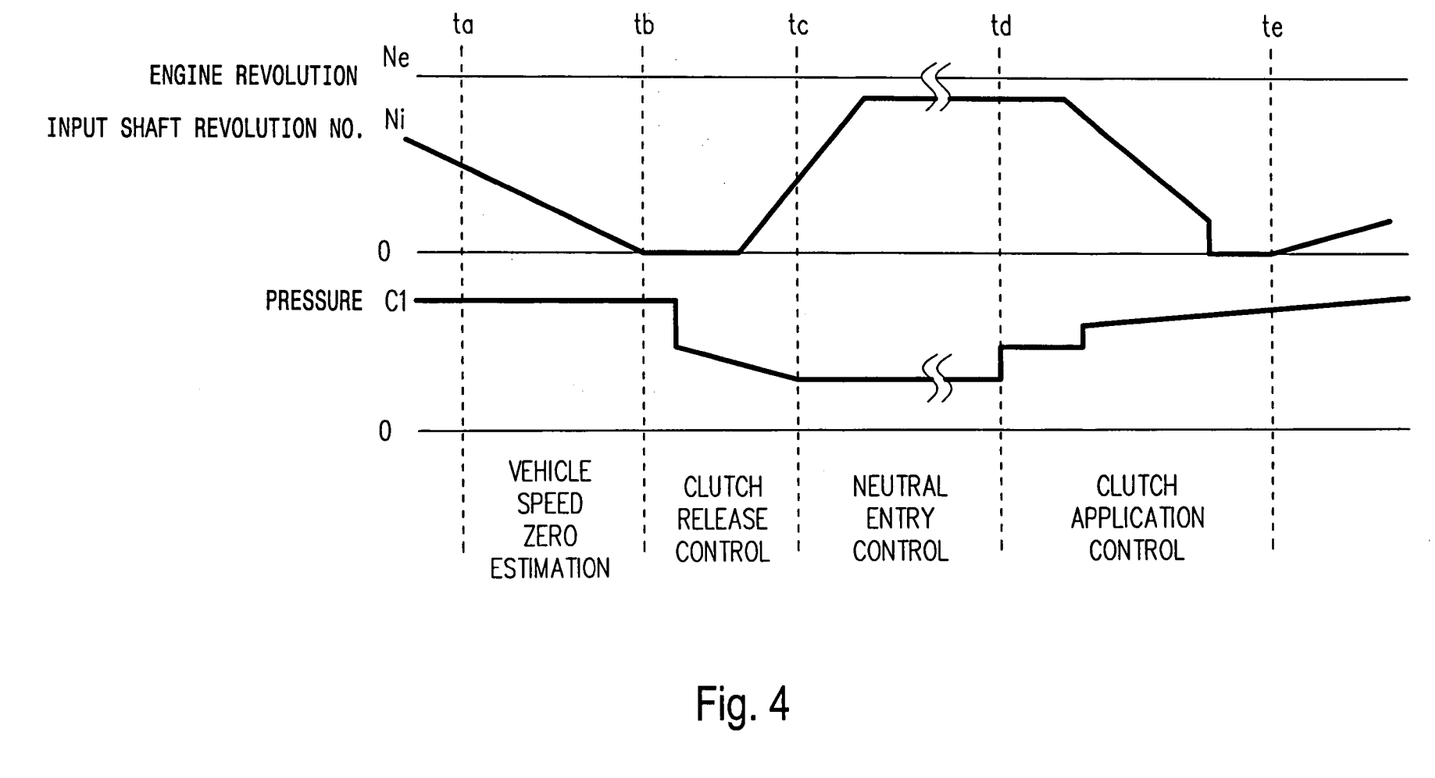
FIG. 4 is a time chart showing an example of a neutral control.

FIG. 4 shows an example of a time chart of the neutral control. For example, when the shift lever 23 is placed in the D range, and the hybrid vehicle moves to a stopped state while the engine 2 is in the drive state and, as shown in FIG. 4, the engine revolution number Ne becomes an idle revolution number that is substantially constant. In addition, during deceleration between time ta and time tb, the clutch C1 is applied. Thus, the input shaft revolution number Ni of the input shaft 37 is reduced, via the driven wheels whose revolution reduces and the automatic speed change mechanism 5. At this time, the clutch control unit 17 estimates when the vehicle speed will become zero based upon a reduction rate of the input shaft revolution number Ni. Note that, in this state, the torque converter 4, interposed between the input shaft 37 and the engine 2, absorbs the difference between the respective rotations thereof.

Next, when the input shaft revolution number Ni becomes zero at time tb, the clutch control unit 17 detects various conditions, such as whether the throttle opening amount is equal to or less than the predetermined value based upon the detection result of the throttle opening amount sensor 28, whether the brake pedal is in the ON state based upon the detection result of the brake sensor 24, and whether a temperature (a fluid temperature) of the fluid within the automatic transmission 10 is equal to or greater than a predetermined value based upon a detection result of an oil temperature sensor (not shown). Then, the clutch control unit 17 determines whether to start the neutral control based upon these conditions. Further, if it is determined that neutral control is to be started, the clutch control unit 17 gradually reduces (sweeps down) the fluid pressure (the application pressure) PCI supplied to the clutch C1 between time tb and time tc so as to execute a clutch release control; the fluid pressure PC1 is controlled such that the clutch C1 enters the state just after complete application or engagement (namely, the start of the substantially slipping state). At this time, along with the gradual release of the clutch C1, the input shaft 37, which is disconnected from the driven wheel side, starts to rotate due to the engine torque. Thus, the input shaft revolution number Ni increases gradually. Further, between time tc and time td, the fluid pressure PC1 supplied to the clutch C1 is controlled so as to end application of the clutch C1. As a result, a neutral entry control is executed whereby a state is attained in which the transmission of power between the input shaft 37 and the driven wheels ceases, namely, a substantially neutral state is attained.

Next, at time td, when the start of movement requirement (for example, a depression force of the brake pedal becomes equal to or less than a predetermined amount, or the like) of the driver is detected, the clutch control unit 17 terminates neutral entry control, and along with this, executes a clutch application control in which the fluid pressure PC1 of the clutch C1 is increased so as to attain the forward first speed state. The fluid pressure PC1 is gradually swept up in order to fully apply the clutch C1 in accordance with the difference in the revolution numbers of the engine revolution number Ne and the input shaft revolution number Ni. As a result, the input shaft 37 and the driven wheels, which are stopped, are applied once again, and the input shaft revolution number Ni becomes zero. Moreover, at time te, the clutch C1 enters the applied state and the input shaft revolution number Ni increases due to torque from the torque converter 4. Accordingly, the driven wheels rotate due to the input of a driving force via the clutch C1, and the hybrid vehicle starts moving.

Figure 5:
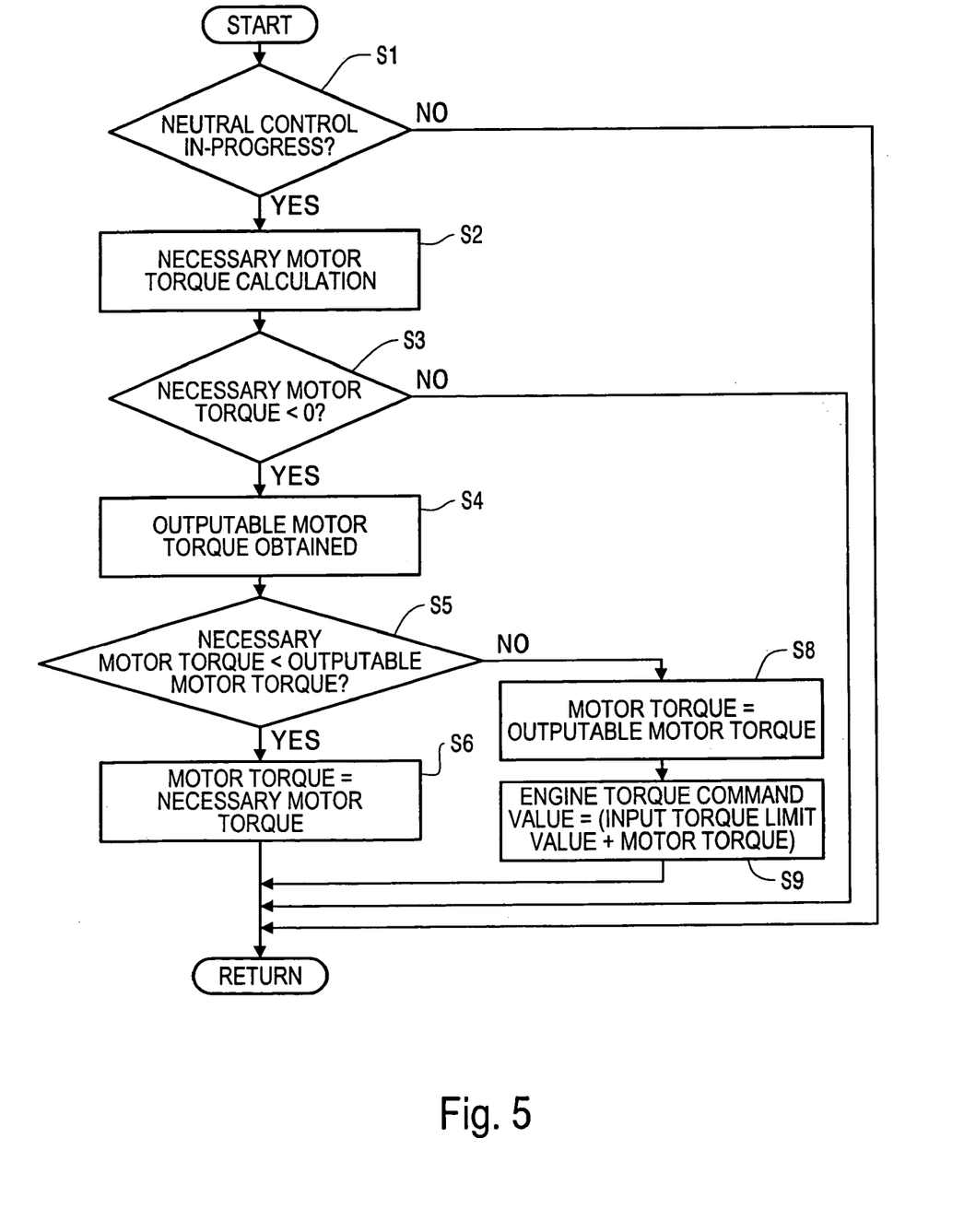
FIG. 5 is a flow chart illustrating control of the control device according to the embodiment of the invention.
Figure 7:
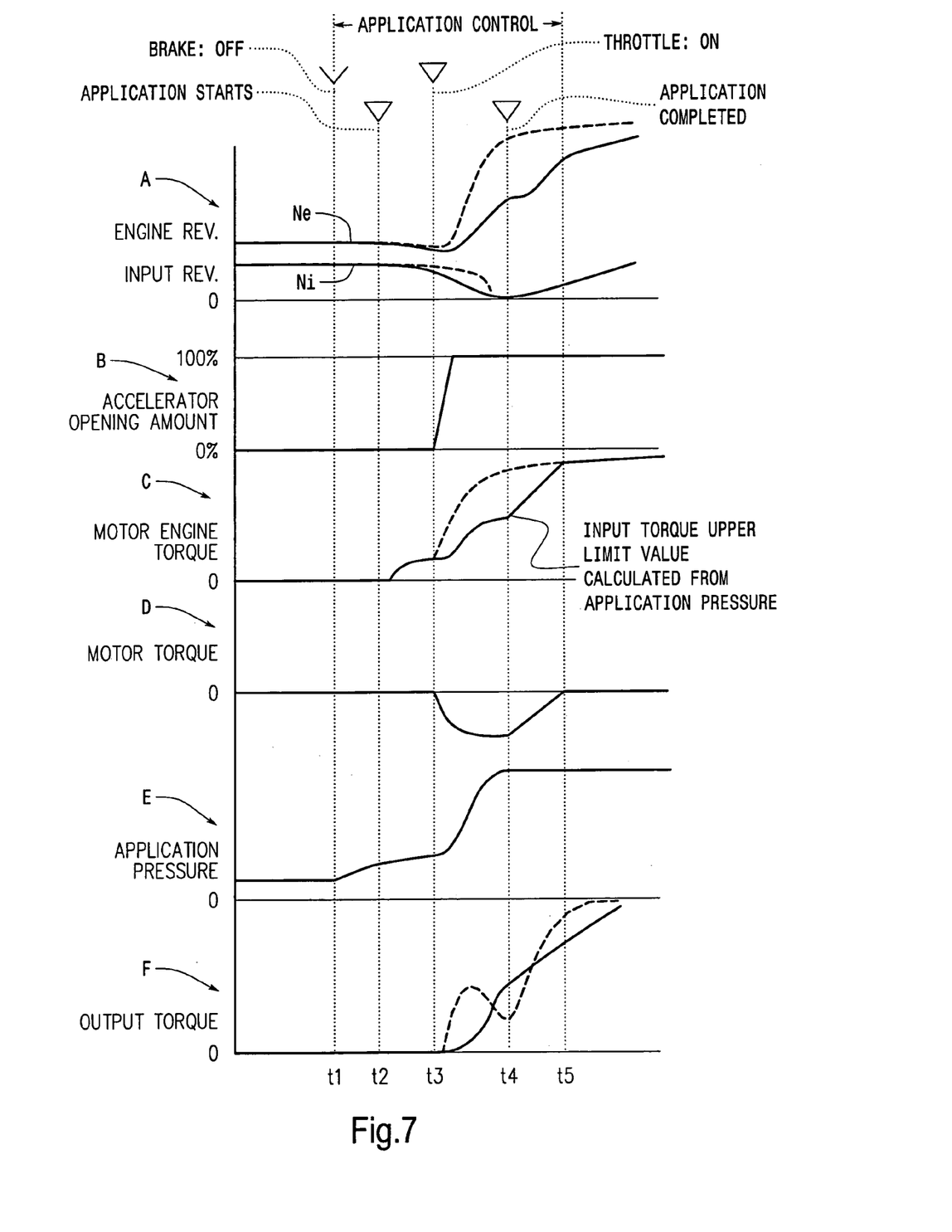
FIG. 7 is a time chart that shows a state during the control of the control device according to the embodiment of the invention.

Next, an explanation will be given of control of the control device according to the embodiment of the invention with reference to FIG. 1 and FIGS. 4 to 7. FIG. 5 is a flow chart that illustrates the control of the control device according to the embodiment of the invention. FIG. 7 is a time chart that shows a state during the control of the control device. Note that, in FIG. 7, A shows the engine revolution number Ne and the input shaft revolution number Ni; B shows the accelerator opening amount (the throttle opening amount); C shows a summed torque of the engine 2 and the motor 3 that is input to the input shaft 37 of the automatic speed change mechanism 5; D shows an output torque (motor torque) of the motor generator 3; E shows the application pressure supplied to the hydraulic servo of the clutch C1; and F shows an output torque transmitted to the vehicle axles 45*l*, 45*r* from the automatic speed change mechanism 5.

First, if an ignition switch (not shown) is turned to ON, and the shift lever 23, shown in FIG. 1 and disposed in proximity to the driver's seat, is shifted to the drive range wherein a hybrid vehicle, having the control device of the invention, is in a stopped state, the control of the control portion U is started. Further, movement is executed such that drive of the engine 2 and the motor generator 3 is switched between, at an appropriate timing, by the engine control unit 14 and the motor control unit 15, in accordance with conditions such as the depression of the accelerator pedal, and the like.

In addition, during the movement as described above, if the driver releases the accelerator pedal and depresses the brake pedal prior to time t1 shown in FIG. 7, the engine 2 is placed into an idling revolution state based upon control of the engine control unit 14. At this time, the control state, shown in FIG. 7, is such that in B the throttle opening amount is 0%; in C the summed torque of the engine 2 and the motor generator 3 is 0 Nm; in D the output torque of the motor generator 3 is 0 Nm; in E the application pressure (the fluid pressure PC1 of FIG. 4) is maintained at the holding pressure; and in F the output torque is 0 Nm. Further, in A, the engine revolution number Ne becomes the idling revolution number, and the input shaft revolution number Ni that had once become 0 Nm starts to recover when the clutch C1 is released (enters the substantially slipping state) so as to become a revolution number that is slightly smaller than the engine revolution number Ne. At this point, the neutral control, namely, the neutral entry control between time tc and td shown in FIG. 4, is executed.

Moreover, at time t1 of FIG. 7 (time td in FIG. 4), when the take-off detection unit 19 detects the start of movement requirement (for example, the depression force of the brake pedal has become equal to or less than the predetermined amount, namely, the brake pedal is released, from the driver, the clutch control unit 17 executes control such that the neutral entry control is terminated, and the application pressure supplied to the clutch C1 is increased so as to start application (time t2). When this occurs, as shown between time td and te of FIG. 4, the clutch application control is started, and between time t2 and time t3 of FIG. 7 the summed torque of C increases slightly. Further, the application pressure supplied to the clutch C1 is swept up at a predetermined sweep amount.

Next, while the application pressure of the clutch C1 is still increasing at time t3, the throttle opening amount increases toward 100% as a result of the accelerator pedal being depressed following the release of the brake pedal. Accordingly, while the clutch C1 is still moving from the slipping state to the fully applied state, the throttle opening amount increases rapidly, and the engine revolution number Ne, as shown by the broken line in A of FIG. 7, is liable to increase rapidly. As a result, the engine torque is also liable to increase rapidly as shown by the broken line in C of FIG. 7. However, the torque control unit 16 controls the motor generator 3 so as to generate negative torque. As a result of the action of this negative torque, the engine revolution number Ne and the engine torque are controlled so as to be inhibited from rising (a limitation control) in line with the solid lines shown in A and C, respectively, of FIG. 7.

Note that calculation of the control values used in the more than described limitation control by the torque control unit 16 is executed as shown in FIG. 5. First, in step S1, it is determined whether the neutral control is in-progress. If it is determined that the neutral control is in-progress the routine proceeds to step S2; if it is not, the processing is terminated. Further, in step S2, a necessary motor torque Tm is calculated. At this time, the torque control unit 16 calculates a torque capacity of the clutch C1, namely, the input torque limit value $T_{in\_MAX}$ that does not cause slipping of the clutch C1, based upon the fluid pressure command value output from the application pressure command unit 18. At this time, the necessary motor torque, namely, the negative torque Tm that it is necessary for the motor generator 3 to output is calculated in accordance with the equation below:

$$T_M = T_{in\_MAX} - Te.$$

Following this, the routine proceeds to step S3.

In step S3, it is determined whether the necessary motor torque Tm is less than zero (i.e., is negative torque). In the case that the result is a negative torque, the routine proceeds to step S4; if not, the processing is terminated. Further, in step S4, after an outputable motor torque at that time is obtained, the routine proceeds to step S5. The outputable motor torque is constrained by such factors as the state of charge (SOC) of the battery 29, a motor revolution number, a motor temperature, a temperature of an inverter (not shown), that generates a drive signal for the motor generator 3, and the like. Accordingly, the outputable motor torque is calculated by the motor control unit 15 as a value that takes into consideration these constraining factors.

In step S5, it is determined whether the necessary motor torque Tm calculated in step S2 is smaller than the outputable motor torque. When it is determined that the necessary motor torque Tm is smaller than the outputable motor torque, the routine proceeds to step S6 and the motor torque is set as the necessary motor torque Tm; however, if not, the routine proceeds to step S8.

In step S8, because the outputable motor torque is equal to or less than the necessary motor torque Tm, the motor torque (negative torque) is set as the outputable motor torque. Further, it is inadequate if just the motor torque is used as the torque for inhibiting the engine torque from becoming excessive. Accordingly, in step S9, in order to directly reduce the engine torque itself, an engine torque command value is calculated as the sum of the input torque limit value $T_{in\_MAX}$ and the motor torque (negative torque). Therefore, in this case, the motor generator 3 is driven by the control of the motor control unit 15 such that the motor torque (negative torque) is obtained. At the same time, the engine 2 is driven by the control of the engine control unit 14 based upon the engine torque command value.

As described above, in the case that the start of movement (take-off) of the hybrid vehicle is detected, the torque control unit 16 calculates the input torque limit value $T_{in\_MAX}$ when the change in the throttle opening amount equal to or more than the predetermined value is detected while the clutch C1 is moved from the substantially slipping state to the fully applied state. Then, the torque control unit 16 outputs the command to the motor control unit 15, the motor generator 3 is controlled so as to execute regeneration, and the negative torque is generated (between time t3 and t5 in D of FIG. 7). As a result of the negative torque, the engine torque supplied to the automatic transmission 10 (the automatic speed change mechanism 5) from the engine 2 is inhibited from becoming excessive.

Accordingly, the summed torque (the motor torque and the engine torque) is limited so as to follow the solid line instead of the broken line (between times t3 and t5 in C of FIG. 7). Further, the engine revolution number Ne, and the input shaft revolution number Ni as well, are limited so as to follow the respective solid lines instead of the broken lines (between times t3 and t5 in A of FIG. 7). As a result, the output torque (between times t3 and t5 in F of FIG. 7) that acts upon the vehicle axles 45l, 45r increases in a very stable manner as indicated by the solid line in F in FIG. 7, without generation of a jolt that is unpleasant for the occupant as indicated by the broken line in F of FIG. 7. In this case, between times t3 and t5 in E of FIG. 7, the application pressure supplied to the clutch C1 reaches the full application pressure at time t4, and from then on the clutch C1 is fully applied.

Figure 8:
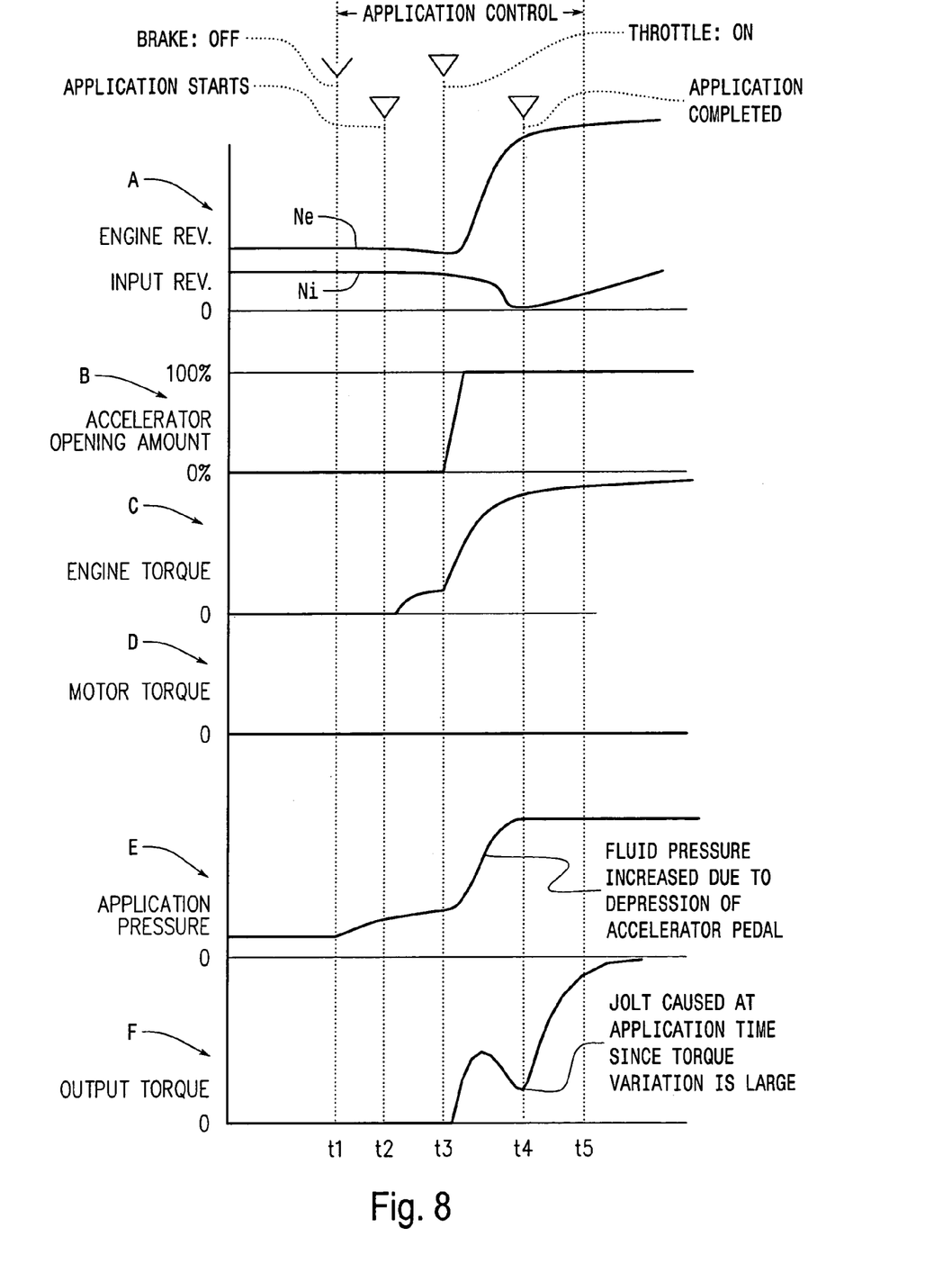
FIG. 8 is a time chart illustrating control when a torque limitation control according to the embodiment of the invention is not executed.

Further, the broken lines described above, that are shown in FIG. 7, illustrate control in the case where the torque limitation control in this embodiment of the invention is not executed. FIG. 8 shows the relevant lines portrayed independently. In the control shown in FIG. 8, the motor torque of D remains at 0 Nm without change, and negative torque for torque limitation control is not generated. Accordingly, the lines of A, C and F in FIG. 8 are not controlled in the same manner as the solid lines of A, C and F in FIG. 7.

According to the embodiment of the invention described above, when the start of movement (the start moving requirement of the driver) is detected, the torque control unit 16 controls the motor generator 3 so as to generate the negative torque by a regeneration operation, and the engine torque supplied to the automatic transmission 10 is inhibited from becoming excessive. Accordingly, by using the motor generator 3 that is specially provided in the hybrid vehicle, even in the case that the accelerator pedal is depressed while the clutch C1 within the automatic transmission 10 moves from the substantially slipping state to the fully applied state, it is possible to reliably inhibit excessive engine torque from being input to the automatic transmission 10 due to the action of the negative torque from the motor generator 3. Accordingly, it is possible to reliably address the problem of the occupant feeling an unpleasant jolt due to the torque transmitted to the driven wheel side rising instantaneously as a result of the friction disks of the clutch C1, which have started application for take-off, beginning to slip, and immediately after this, the clutch C1 being applied once again. In addition, it is possible to inhibit heat build-up of the friction disks that configure the clutch C1.

Further, when the brake operation detection unit 22 detects a change from a braking state to a non-braking state of the brake pedal, the take-off requirement detection unit 19 detects the start of movement of the hybrid vehicle. Accordingly, it is possible to reliably detect a take-off timing which is required for execution of the limitation control for excessive engine torque. Further, the torque control unit 16 executes driving control of the motor generator 3 such that the negative torque becomes the predetermined value when the change in the throttle opening amount at the engine 2 side equal to or greater than the predetermined value is detected while the clutch C1 is moving from the substantially slipping state to the fully applied state. As a result, it is possible to reliably execute limitation control of the engine torque at the timing at which excessive engine torque is potentially about to be input to the automatic transmission 10. In addition, the torque control unit 16 calculates the input torque limit value for the clutch C1 based upon the application pressure command value from the application pressure command unit 18, and then calculates the negative torque that needs to be output from the motor generator 3 based upon the calculated input torque limit value and the engine torque at the time of the calculation thereof. Accordingly, it is possible to accurately calculate the value of the negative torque that will reliably inhibit the excessive engine torque that is potentially about to be input to the automatic transmission 10.

Note that, according to the invention, the limitation function for engine torque can be effectively used not only when executing the start of movement following the neutral control, as with this embodiment of the invention, but also when executing the start of movement following switching from the neutral (N) range to the drive (D) range, and when executing take-off following switching from the neutral (N) range to the reverse (R) range. Moreover, the invention is applied to limiting the input torque on occasions when clutch application is being restored following the neutral control. However, the invention is not limited to this, and may be applied to limiting torque at times of take-off when the clutch is applied.

Further, the embodiment of the invention may be configured so as to execute a so-called idle stop control in which, at the time point when it is detected that the vehicle speed has become 0 [km/h] by the vehicle speed detection unit 20 during the ignition control of the engine control unit 14, injection is stopped and drive of the engine 2 is stopped. Then, following the start of running, using just the motor generator 3, when the throttle opening amount becomes equal to or greater than the predetermined value and engine revolution number becomes equal to or greater than the predetermined value, fuel injection is started, ignition firing is executed and the engine 2 rotatably driven. Moreover, even when this type of idle stop control is executed, during start of movement executed while fluid pressure is supplied by the electric motor-driven oil pump 8 with an output (at a power) that is lower than that of the mechanical oil pump 7, and immediately after this, when the accelerator pedal is depressed while the supply of fluid pressure from the mechanical oil pump 7 driven after firing of the engine 2 is not enough, the throttle opening amount increases rapidly prior to the clutch C1 moving to the fully applied state from the substantially slipping state. As a result, it is conceivable that the engine torque that is suddenly input to the automatic speed change mechanism 5 will exceed the input torque limit value that is permissible by the application pressure that is increased gradually at the predetermined sweep amount. However, even in this case, by generating the negative torque of the motor generator 3 as explained for the embodiment of the invention, it is possible to inhibit the excessive engine torque and address the problem of the occupant feeling an unpleasant jolt due to a sudden increase in the torque transmitted to the driven wheel side.

What is claimed is:

1. A control device for a hybrid vehicle having a motor drivingly coupled with an engine, and a transmission which transmits an output torque that is output from the engine and the motor to driven wheels, comprising:
    a take-off requirement detection unit that detects a start of movement requirement of a driver;
    a torque control unit that calculates an input torque limit value for an input torque that is input to a clutch in the transmission and a negative torque that is necessary to output from the motor based upon the calculated input torque limit value and an engine torque at the time of calculation of the input torque limit value; and
    a motor control unit that limits torque input by controlling the motor to output the negative torque calculated by the torque control unit when the start of movement requirement of the hybrid vehicle is detected by the take-off requirement detection unit.

2. The control device for a hybrid vehicle according to claim 1, further comprising a brake operation state detection unit that detects an operation state of a brake resulting from operation by the driver, wherein the take-off requirement detection unit detects the start of movement requirement based on the operation state of the brake detected by the brake operation state detection unit.

3. The control device for a hybrid vehicle according to claim 2, further comprising:
    an application pressure supply unit that supplies an application pressure for the clutch within the transmission; and
    an application pressure command unit that outputs an application pressure command value that sets the application pressure at a predetermined value to the application pressure supply unit, wherein the input torque limit value is based upon the application pressure command value output from the application pressure command unit.

4. The control device for a hybrid vehicle according to claim 3, wherein the torque control unit calculates, when calculating the negative torque, a necessary motor torque that forms a basis of the negative torque, and when it is determined that the necessary motor torque is less than zero, obtains an outputable motor torque at that time.

5. The control device for a hybrid vehicle according to claim 4, wherein the torque control unit sets, when the outputable motor torque is a value equal to or less than the necessary motor torque, the outputable motor torque as a torque that it is necessary to output from the motor for the negative torque.

6. The control device for a hybrid vehicle according to claim 5, wherein the torque control unit also calculates the engine torque that is necessary to add to the set outputable motor torque.

7. The control device for a hybrid vehicle according to claim 1, further comprising a neutral control unit that, when the hybrid vehicle stops while the transmission remains switched to a drive range, executes control such that torque transmitted by a clutch that is applied when the drive range is selected is in a reduced state of transmitted torque, and when the start of movement requirement of the driver is detected by the take-off requirement detection unit, executes control such that the clutch is placed in a fully applied state, wherein the torque control unit executes driving control of the motor such that the negative torque becomes a predetermined value while the clutch moves from the reduced state of transmitted torque to the fully applied state.

8. The control device for a hybrid vehicle according to claim 7, wherein the torque control unit executes driving control of the motor such that the negative torque becomes the predetermined value when a throttle opening amount at the engine side changes by a predetermined value or more.

9. The control device for a hybrid vehicle according to claim 8, further comprising:
    an application pressure supply unit that supplies an application pressure for the clutch within the transmission; and an application pressure command unit that outputs an application pressure command value that sets the application pressure at a predetermined value to the application pressure supply unit, wherein the torque control unit calculates an input torque limit value for an input torque that is input to the clutch based upon the application pressure command value output from the application pressure command unit, and calculates the negative torque that is necessary to output from the motor based upon the calculated input torque limit value and an engine torque at the time of calculation of the input torque limit value.

10. The control device for a hybrid vehicle according to claim 9, wherein the torque control unit calculates, when calculating the negative torque, a necessary motor torque that forms a basis of the negative torque, and when it is determined that the necessary motor torque is less than zero, obtains an outputable motor torque at that time.

11. The control device for a hybrid vehicle according to claim 10, wherein the torque control unit sets, when the outputable motor torque is a value equal to or less than the necessary motor torque, the outputable motor torque as torque that is necessary to output from the motor for the negative torque.

12. The control device for a hybrid vehicle according to claim 11, wherein the torque control unit also calculates the engine torque that is necessary to add to the set outputable motor torque.

13. The control device for a hybrid vehicle according to claim 7, further comprising:
an application pressure supply unit that supplies an application pressure for the clutch within the transmission; and
an application pressure command unit that outputs an application pressure command value that sets the application pressure at a predetermined value to the application pressure supply unit, wherein the torque control unit calculates an input torque limit value for an input torque that is input to the clutch based upon the application pressure command value output from the application pressure command unit, and calculates the negative torque that is necessary to output from the motor based upon the calculated input torque limit value and an engine torque at the time of calculation of the input torque limit value.

14. The control device for a hybrid vehicle according to claim 13, wherein the torque control unit calculates, when calculating the negative torque, a necessary motor torque that forms a basis of the negative torque, and when it is determined that the necessary motor torque is less than zero, obtains an outputable motor torque at that time.

15. The control device for a hybrid vehicle according to claim 14, wherein the torque control unit sets, when the outputable motor torque is a value equal to or less than the necessary motor torque, the outputable motor torque as torque that is necessary to output from the motor for the negative torque.

16. The control device for a hybrid vehicle according to claim 15, wherein the torque control unit also calculates the engine torque that is necessary to add to the set outputable motor torque.

17. The control device for a hybrid vehicle according to claim 1, further comprising:
an application pressure supply unit that supplies an application pressure for the clutch within the transmission; and
an application pressure command unit that outputs an application pressure command value that sets the application pressure at a predetermined value to the application pressure supply unit, wherein the torque control unit calculates an input torque limit value for an input torque that is input to the clutch based upon the application pressure command value output from the application pressure command unit, and calculates the negative torque that is necessary to output from the motor based upon the calculated input torque limit value and an engine torque at the time of calculation of the input torque limit value.

18. The control device for a hybrid vehicle according to claim 17, wherein the torque control unit calculates, when calculating the negative torque, a necessary motor torque that forms a basis of the negative torque, and when it is determined that the necessary motor torque is less than zero, obtains an outputable motor torque at that time.

19. The control device for a hybrid vehicle according to claim 18, wherein the torque control unit sets, when the outputable motor torque is a value equal to or less than the necessary motor torque, the outputable motor torque as torque that is necessary to output from the motor for the negative torque.

20. The control device for a hybrid vehicle according to claim 19, wherein the torque control unit also calculates the engine torque that is necessary to add to the set outputable motor torque.

21. The control device for a hybrid vehicle according to claim 1, wherein the transmission is provided with a fluid transmission unit that receives the output torque that is output from the engine and the motor, and an automatic speed change mechanism that receives the output torque via the fluid transmission unit, wherein the motor is provided with an output member which is directly coupled to an output shaft of the engine, and which is coupled to an input member of the fluid transmission unit.

22. A control method for a hybrid vehicle having a motor drivingly coupled with an engine, and a transmission which transmits an output torque that is output from the engine and the motor to driven wheels, comprising:
detecting a start of movement requirement of a driver;
calculating an input torque limit value for input to the transmission;
determining an engine torque; and
generating a negative torque using the motor when the start of movement requirement of the hybrid vehicle is detected and the engine torque exceeds the input torque limit value.

23. The method according to claim 22, further comprising detecting an operation state of a brake resulting from operation by the driver, wherein the detecting of the start of movement requirement is based on the detected operation state of the brake.

24. The method according to claim 1, further comprising executing a control, when the hybrid vehicle stops while the transmission remains switched to a drive range, such that torque transmitted by a clutch, that is applied when the drive range is selected, is in a reduced state of transmitted torque, and when the start of movement requirement is detected, executing a control such that the clutch is placed in a fully applied state, wherein driving control of the motor is executed such that the negative torque becomes a predetermined value while the clutch moves from the reduced state of transmitted torque to the fully applied state.

* * * * *